United States Patent [19]

Haggerty

[11] 3,968,068

[45] July 6, 1976

[54] GLASS SIZING

[75] Inventor: William N. Haggerty, Reynoldsburg, Ohio

[73] Assignee: Owens-Corning Fiberglas Corporation, Toledo, Ohio

[22] Filed: June 7, 1974

[21] Appl. No.: 477,246

[52] U.S. Cl. ............... 260/29.6 RB; 260/29.6 MM; 260/29.6 MN; 428/392
[51] Int. Cl.² ................... C03C 25/02; C08L 31/04
[58] Field of Search ............. 260/29.6 R, 29.6 RB, 260/29.6 BM, 29.6 MM, 29.6 MN; 117/126 AB, 126 GB, 126 GS; 428/392

[56] References Cited
UNITED STATES PATENTS

| | | | |
|---|---|---|---|
| 3,025,588 | 3/1962 | Eilerman | 117/126 GS |
| 3,040,413 | 6/1962 | Marzocchi | 117/126 GB |
| 3,116,192 | 12/1963 | Eilerman | 260/29.6 RB |
| 3,245,938 | 4/1966 | Dennis | 260/19.6 R |
| 3,261,736 | 7/1966 | Eilerman | 260/29.6 MM |
| 3,262,809 | 7/1966 | Aber | 117/72 |
| 3,865,768 | 2/1975 | Mohr | 260/29.6 MN |

*Primary Examiner*—Paul R. Michl
*Attorney, Agent, or Firm*—John W. Overman; Philip R. Cloutier

[57] ABSTRACT

A sizing composition for glass fibers is disclosed, the sizing containing a silane coupling agent, a chromic complex, a vinyl acetate copolymer and a polyvinyl acetate homopolymer, the sizing being particularly suitable for application to gun roving.

15 Claims, No Drawings

GLASS SIZING

This invention relates to a sizing composition.

In one of its more specific aspects, this invention relates to a sizing composition for glass fibers which are incorporated in resin systems.

The use of glass fiber reinforced plastics is well known. Such plastics generally consist of a resin containing short lengths small diameter glass fibers, the fibers having been dispersed throughout resin for the purpose of imparting strength to the resin when molded or when applied as a coating sprayed from gun applicators.

Frequently, the glass fibers are incorporated in the resin in the form of roving, that is, the glass has been emitted from a bushing in single filaments, a plurality of which, as a matter of feasibility in handling, have been gathered together in rovings comprising a multiplicity of filaments, the roving being wound into a package known as a roving ball.

The roving is subsequently fed from the ball into a roving gun which chops the roving into short lengths and sprays these together with resin-forming liquids onto a substrate. While it is desirable that the strands forming the roving separate from each other upon dispersion of the glass fibers in the resin, it is equally desirable that the strands, themselves, do not separate into individual fibers. In other words, it is desirable that the resin envelope the glass fibers in the form of a plurality of filaments bound together by the size, rather than envelope the glass fibers in the form of individual filaments.

It is customary to apply a size to the glass filaments approximately at the time of their formation. The application of a size reduces filament breakage, and reduces the amount of fuzzing of the filaments when in roving form. However, it is important that the sizing is not detrimental to the chopping of the roving and that the sizing not interfere with rapid wet-out of the glass fibers by the resin, that is, that the sizing not interfere with the rapid and uniform dispersion of the glass throughout the resin, and that the sizing facilitate the dispensal of the glass as fiberous bundles rather than as individual filaments. The present invention solves these problems by providing at least one glass filament at least a portion of the surface of which is in contact with an after-defined residue of an aqueous composite, the residue from the size being present in a quantity sufficient to allow separation of the roving into its composite strands while maintaining the integrity of the strands.

Also, according to this invention, there is provided a glass fiber size consisting of a solid resulting from the evaporation of the water from an aqueous composite consisting essentially of a non-plasticized vinyl acetate copolymer, a polyvinyl acetate homopolymer, a partial amide and an anionic fatty acid long chain derivative. Inasmuch as the copolymer and the homopolymer can be comparable they will be distinguished herein by employing the above terms as specific to each.

In addition, the aqueous composite can comprise a vinyl-tri (beta-methoxyethoxy)silane, a Werner-type chromium complex comprising methacrylatochromic chloride, and acetic acid.

The aqueous composition will be comprised of the non-plasticized vinyl acetate copolymer in an amount within the range of from about 3 to about 7 weight percent, preferably in an amount within the range of from about 4 to about 6 weight percent. In the preferred embodiment of the invention, the first vinyl acetate copolymer will be employed in an amount of about 5 weight percent. This material is available as "Resyn 25-2211" from National Starch and the aforementioned percentages are expressed on an "as received basis" relative to that commercial material. "Resyn 25-2211" is a copolymer of 15 parts ethyl acrylate per 100 parts vinyl acetate.

The aqueous composition will be comprised of the polyvinyl acetate homopolymer in an amount within the range of from about 1.5 to about 4 weight percent, preferably in an amount within the range of from about 2 to about 3.5 weight percent. In the preferred embodiment of the invention, the polyvinyl acetate hompolymer will be employed in an amount of about 2.9 weight percent. Such a material is available as "Gelva TS-85" from Monsanto Chemical Co. and the aforementioned percentages are expressed on an "as received basis" relative to that commercial material.

The aqueous composition will be comprised of a amide having the following general structural formula:

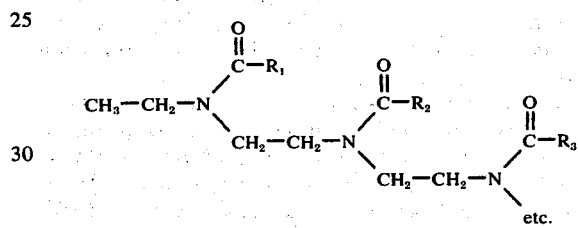

wherein $R_1$, $R_2$ and $R_3$, etc. represent a mixture of fatty acid chain lengths. The amide will be present in the size in an amount within the range of from about 0.03 to about 0.05 weight percent and preferably in an amount of about 0.04 weight percent.

The aqueous composition will be comprised of an anionic fatty acid long chain derivative in an amount within the range of from about 0.05 to about 0.25 weight percent, preferably in an amount within the range of from about 0.1 to about 0.2 weight percent. In the preferred embodiment of the invention, the anionic fatty acid long chain derivative will be employed in an amount of about 0.15 weight percent.

Such a material is available as "Emery Twitchell Oil 7740" from Emery Industries, Inc. and the aforementioned percentages are expressed on an "as received basis" relative to that commercial material.

In addition to the foregoing, the aqueous composition of this invention can comprise a vinyl-tri(beta methoxyethoxy)silane in an amount within the range of from about 0.1 to about 0.3 weight percent, preferably in an amount within the range of from about 0.15 to about 0.25 weight percent. In the preferred embodiment of the invention, the silane can be contained in an amount of about 0.2 weight percent. Such a material is commercially available as "A-172" from Union Carbide Corporation and the aforementioned percentages are expressed on an "as received basis" relative to that material.

The aqueous composition of this invention can comprise a Werner-type chromium complex comprising methacrylatochromic choride in an amount within the range of from about 1 to about 2 wieght percent, preferably in an amount within the range of about 1.3 to about 1.7 weight percent. In the preferred embodiment of the invention, the chromium complex can be contained in an amount of about 1.5 weight percent. Such a material is commercially available as "Volan" from DuPont de Nemours, Inc. and the aforementioned percentages are expressed on an "as received basis" relative to that material.

The aqueous composition of this invention can comprise glacial acetic acid in an amount sufficient to bring the pH to a maximum value of about 4.4, with the preferred pH value being about 4. For this purpose, glacial acetic will be employed in an amount of about 0.15 weight percent.

The balance of the aqueous composition will be water, preferably deionized, employed in such an amount that the percent solids in the finished size is not more than about 5.5 weight percent and preferably about 5 weight percent under which conditions, when properly applied to the glass, result in a preferred dry strand solids content of about 1.25 weight percent.

The method of preparing 100 gallons of the size of this invention is set forth in the following example in the preferred embodiment.

Twenty five gallons of deionized water at about 75°F are introduced into a 60 gallon capacity Hamilton premix kettle and agitated in the absence of introducing air into the water.

About 1.7 pounds of the silane are added slowly to the premix kettle and agitation is undertaken until a clear solution is obtained. The resulting solution is introduced into the Hamilton premix kettle.

About 15 gallons of warm deionized water are introduced into a container. The water is agitated so that no air is drawn into the container. About 41.8 pounds of the non-plasticized vinyl acetate copolymer emulsion are added to the 15 gallons of water. After a minimum of 5 minutes agitation, about 24.3 pounds of the polyvinyl acetate homopolymer are added to the contents of the container. Agitation is continued for another 5 minutes and the resulting solution is introduced into the contents of the Hamilton premix kettle.

About 2 gallons of deionized water are introduced into a premix kettle and the water is heated to about 155°F while agitating so as to draw no air into the kettle. About one-third of a pound of the partial amide is weighed into a stainless steel container and 1 gallon of deionized water at about 155°F is added to the partial amide, with stirring until a clear solution is obtained. About 0.15 pounds of acetic acid which has been diluted about 5 to 1 with deionized water is added to the partial amide and the composite is stirred until completely mixed. The composite, which should have a pH of about 6, is immediately introduced into the Hamilton premix kettle.

About 5 gallons of deionized water at about 75°F are added to a premix kettle and agitated so as to draw no air. About 12.5 pounds of the methacrylatochromic chloride are introduced into the premix kettle over a period of about 1 minute. After 15 minutes, minimum, agitation, the resulting methacrylatochromic chloride solution is introduced into the Hamilton premix kettle.

About 1¼ pounds of the anionic fatty acid long chain derivative are diluted with 2 gallons of deionized water and the mixture is agitated until uniform and introduced into the Hamilton premix kettle.

The volume of the total mix is adjusted with deionized water to give a 100 gallon mixture having a solids content within the range of from about 5.0 to about 5.5%. The pH of the finished size should be within the range of from about 4.0 to about 4.4.

The size of this invention can be applied to a single filament or to a multiplicity of filaments in any suitable manner. Preferably, it will be applied to a plurality of filaments from a conventional graphite applicator, the filaments being collected into a roving package which is oven dried at about 265°F. The oven dried forming stock is then fabricated into roving packages comprising glass filaments having adhered to their surface a solid formed by the evaporation of the aqueous portion of the size, the solids comprising about 1.16 to about 1.3 weight percent of the total strand weight, with about 1.25 weight percent solids being preferred. In this respect, it is important to note that for best performance of the size of this invention, the strand solids is determinative rather than the solids content of the size.

While the size of this invention can be applied to any glass fibers, it is well adapted to glass filaments having diameters of from about 0.0001 to about 0.00079 inches and particularly to fibers having a diameter within the range of from about 0.00035 inches to about 0.0004 inches.

The composition of the size prepared in accordance with the previous example will be of the following approximate composition:

| Component | % By Weight As Received | Pounds per 100 gals. |
|---|---|---|
| Vinyl-tri(beta-methoxyethoxy)silane | 0.2 | 1.7 |
| Chromium Complex | 1.5 | 12.5 |
| Vinyl acetate Copolymer | 5.0 | 41.8 |
| Polyvinylacetate homopolymer | 2.9 | 24.3 |
| Partial amide | 0.04 | 0.33 |
| Glacial Acetic Acid | 0.02 | 0.15 |
| Anionic fatty acid long chain derivative | 0.15 | 1.25 |
| Water, deionized | Balance | Balance |

It will be evident from the foregoing that various modifications can be made to this invention. Such, however, are considered within the scope of the invention.

What is claimed is:

1. At least one glass filament, at least a portion of the surface of said filament being in contact with the residue produced by evaporting water from an aqueous composition consisting essentially of a non-plasticized vinyl acetate copolymer emulsion, a polyvinyl acetate homopolymer, a vinyl-tri(beta-methoxyethoxy)silane, a methacrylatochromic chloride, a amide and water said amide having the formula

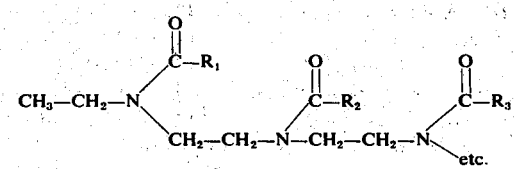

wherein $R_1$, $R_2$ and $R_3$, represent a mixture of fatty acid chain lengths.

2. The glass filament of claim 1 in which said composition consisting essentially of glacial acetic acid and an anionic fatty acid long chain derivative.

3. The glass filament of claim 1 in which said composition consisting essentially of said non-plasticized vinyl acetate copolymer emulsion in an amount within the range of from about 3 to about 7 weight percent and said polyvinyl acetate homopolymer in an amount within the range of from about 1.5 to about 4 weight percent.

4. The glass filament of claim 3 in which said composition consisting essentially of said vinyl-tri(beta-methoxyethoxy)silane in an amount within the range of from about 0.1 to about 0.3 weight percent.

5. The glass filament of claim 4 in which said composition consisting essentially of said methacrylatochromic chloride in an amount within the range of from about 1 to about 2 weight percent.

6. The glass filament of claim 5 in which said composition consisting essentially of said amide in an amount within the range of from about 0.03 to about 0.05 weight percent.

7. The glass filament of claim 1 in which said residue consisting essentially of from about 1.16 to about 1.3 weight percent of the total weight of said glass filament and said residue.

8. At least one glass filament, at least a portion of the surface of said filament being in contact with the residue produced by evaporating water from an aqueous composition consisting essentially of a non-plasticized vinyl acetate copolymer emulsion, a polyvinyl acetate homopolymer, a amide and an anionic fatty acid long chain derivative and water said amide having the formula

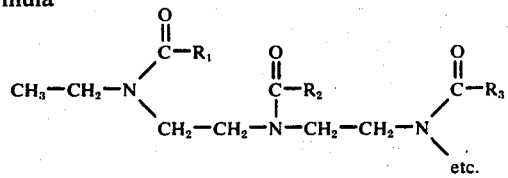

wherein $R_1$, $R_2$ and $R_3$ represent a mixture of fatty acid chain lengths.

9. The glass filament of claim 8 in which said non-plasticized vinyl acetate copolymer emulsion is present in said aqueous composition in an amount within the range of from about 3 to about 7 weight percent.

10. The glass filament of claim 8 in which said polyvinyl acetate homopolymer is present in said aqueous composition in an amount within the range of from about 1.5 to about 4 weight percent.

11. The glass filament of claim 8 in which said amide is present in said aqueous composition in an amount within the range of from about 0.03 to about 0.05 weight percent.

12. The glass filament of claim 8 in which said anionic fatty acid long chain derivative is present in said aqueous composition in an amount within the range of from about 0.05 to about 0.25 weight percent.

13. The glass filament of claim 8 in which said non-plasticized vinyl acetate copolymer emulsion is present in said composition in an amount of about 5 weight percent, said polyvinyl acetate homopolymer is present in said composition in an amount of about 2.9 weight percent, said partial amide is present in said composition in an amount of about 0.04 weight percent and said anionic fatty acid long chain derivative is present in said composition in an amount of about 0.15 weight percent.

14. A sizing composition comprising the aqueous composition defined in claim 1.

15. A sizing composition comprising the aqueous composition defined in claim 8.

* * * * *